United States Patent
Chang et al.

(10) Patent No.: US 6,337,980 B1
(45) Date of Patent: Jan. 8, 2002

(54) MULTIPLE SATELLITE MOBILE COMMUNICATIONS METHOD AND APPARATUS FOR HAND-HELD TERMINALS

(75) Inventors: Donald C. D. Chang, Thousand Oaks; John I. Novak, III, West Hills; Kar Yung, Torrance; Frank A. Hagen, Palos Verdes Estates; Ming U. Chang, Rancho Palos Verdes; William Mayfield, Torrance, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/271,997

(22) Filed: Mar. 18, 1999

(51) Int. Cl.[7] ............................................. H04B 7/185
(52) U.S. Cl. ....................... 455/430; 455/13.1; 455/67.6
(58) Field of Search ................................ 455/13.1, 13.2, 455/12.1, 67.6, 427, 428, 429, 430, 447, 502, 503; 375/211; 370/316, 326

(56) References Cited

U.S. PATENT DOCUMENTS

| | | | | |
|---|---|---|---|---|
| 3,384,891 A | * | 5/1968 | Anderson | 342/357.01 |
| 3,544,995 A | * | 12/1970 | Bottenburg et al. | 342/46 |
| 4,819,227 A | * | 4/1989 | Rosen | 370/325 |
| 5,233,626 A | * | 8/1993 | Ames | 375/1 |
| 5,278,863 A | * | 1/1994 | Briskman | 375/1 |
| 5,319,673 A | * | 6/1994 | Briskman | 375/1 |
| 5,485,485 A | * | 1/1996 | Briskman et al. | 375/130 |
| 5,592,471 A | * | 1/1997 | Briskman | 455/52.3 |
| 5,644,572 A | * | 7/1997 | Olds et al. | 370/324 |
| 5,864,579 A | * | 1/1999 | Briskman | 375/200 |
| 5,969,674 A | * | 10/1999 | Von Der Embse et al. | 342/357.16 |
| 6,138,012 A | * | 10/2000 | Krutz et al. | 455/427 |
| 2001/0000167 | * | 4/2001 | Chang et al. | 455/13.1 |

* cited by examiner

*Primary Examiner*—William Trost
*Assistant Examiner*—Rafael Perez-Gutierrez
(74) *Attorney, Agent, or Firm*—Vijayalakshmi D. Duraiswamy; Michael W. Sales

(57) ABSTRACT

A novel mobile satellite communications technique for hand-held terminals includes a satellite system having a plurality of individual satellites all in communication with a ground telecommunications hub. A signal processed by the ground telecommunications hub is radiated through multiple paths to a plurality of the individual satellites in the satellite constellation simultaneously. The radiated signal is then re-radiated by the plurality of individual satellites to a mobile satellite terminal that receives the re-radiated signal from the plurality of individual satellites simultaneously such that the same frequency spectrum may be re-used by another mobile user.

13 Claims, 3 Drawing Sheets

MULTIPLE SATELLITE MOBILE COMMUNICATIONS METHOD AND APPARATUS FOR HAND-HELD TERMINALS

TECHNICAL FIELD

The present invention relates generally to a mobile satellite communication system. More specifically, the present invention relates to a mobile satellite communication system with increased user capacity by allowing frequency re-use through the use of multiple satellites to radiate one signal.

BACKGROUND ART

Current mobile satellite communication systems, such as Iridium, Globalstar, and ICO, utilize low-cost user terminals as one of their key system features. To maintain communications linkage with these current mobile systems, the system satellites provide multiple beam and high-gain services to the subscribers. The low-cost and low-gain hand-held terminals utilized by the users of these systems, transmit and receive signals to and from high performance satellites which populate almost the entire hemisphere. Some of these current systems require the usage of at least two satellites to assure a soft hand-over process as the satellites progress from horizon to horizon. As a result, as more satellites come into a user's field of view (FOV), the satellite system becomes more reliable and available. The satellite constellations provided by these current systems are thus sized to guarantee a minimum number of satellites within a user's FOV over large coverage areas at all times.

All of these current mobile satellite communication systems, however, suffer from a variety of disadvantages. First, they all have limited frequency resources. Any given frequency over a given ground position can only be utilized by one user at a time. This is true regardless of the sophistication of the system, including systems that utilize multiple beam satellite designs. Even when multiple satellites are available at a given geographic location, the same frequency spectrum cannot be used by more than one nearby user. The availability of multiple satellites merely serves to increase the availability of the system to that user who is assigned the specific frequency spectrum. However, the total capacity of these mobile communication satellite systems is still limited by the inefficient usage of the frequency spectrum. Thus, the potential growth of these current satellite communication systems is inherently limited.

Additionally, current telecommunications systems only allow mobile-to-hub and hub-to-mobile communications in most of the low earth orbit and medium earth orbit mobile satellite constellations. Mobile-to-mobile linkages require multiple hops between hubs. Thus, one user utilizes a satellite at a frequency slot to communicate to his counterpart on the network. Other satellites on or in the same region cannot reuse the same frequency slot for other nearby users. Thus, if a secondary user nearby has a handset that requires a particular frequency, which is being utilized by the first user nearby, the second user is unable to access the system through the same frequency via different satellites. It is therefore desirable to provide a mobile communication satellite system that relaxes these constraints and more efficiently utilizes current mobile satellite communication system resources, while also providing much greater opportunity for system growth.

SUMMARY OF THE INVENTION

It is an object of the present invention to provide a mobile satellite communication system with no limitation on frequency re-use for point-to-point communications.

It is another object of the present invention to provide a mobile satellite communication system that utilizes simple and low cost satellite designs.

It is a further object of the present invention to provide a mobile satellite communication system with high system reliability through graceful degradation.

It is still another object of the present invention to provide a mobile satellite communication system wherein the individual satellites and the mobile terminals are of low complexity with the complexity of the system concentrated at the ground hub terminal.

It is yet another object of the present invention to provide a mobile satellite communication system with more accurate capabilities for satellite and user positioning.

In accordance with the objects of the present invention, a novel mobile satellite communications technique for handheld terminals is provided. The mobile satellite communications system includes a satellite system having a plurality of individual satellites. The plurality of individual satellites are each in communication with a ground telecommunications hub such that a signal processed by the ground telecommunications hub is radiated through multiple paths to a plurality of the individual satellites in the satellite constellation. The radiated signal is then re-radiated by the plurality of individual satellites to a mobile satellite terminal which receives the re-radiated signal from the plurality of individual satellites simultaneously such that the same frequency spectrum may be re-used by another mobile user.

These and other features of the present invention will become apparent from the following description of the invention, when viewed in accordance with the accompanied drawings and appended claims.

BEST MODE(S) FOR CARRYING OUT THE INVENTION

Referring now to the figures, the disclosed mobile communication system can be utilized to break away from the frequency spectrum limitation discussed above and provide much more efficient means to re-use the allocated mobile satellite spectrum multiple times. By eliminating this frequency spectrum limitation, the overall capacity of existing mobile satellite communication systems will be allowed to grow.

Figure 1:
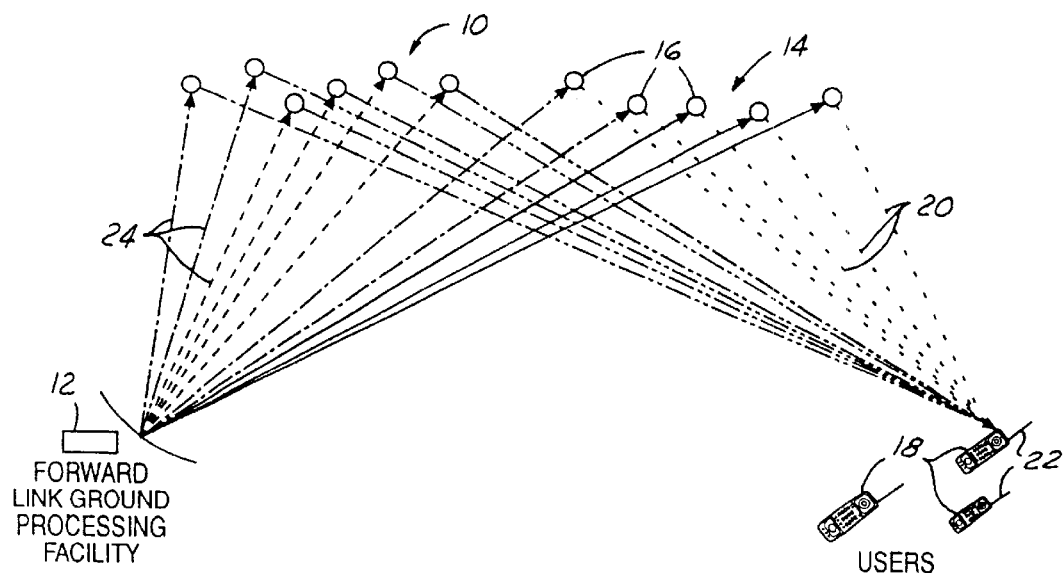
FIG. 1 is a perspective view illustrating the forward link geometry of a mobile satellite communications system in accordance with a preferred embodiment of the present invention.

Referring now to FIG. 1, a mobile satellite communication system 10 in accordance with a preferred embodiment of the present invention is illustrated. In FIG. 1, the mobile satellite communications system 10 is illustrated in a forward link mode. The mobile satellite communications system 10 includes a ground telecommunications hub 12, a satellite constellation 14 including a plurality of individual satellites 16, and a plurality of hand-held user terminals 18 such as mobile phones. As discussed in more detail below, the user terminals 18 can receive signals 20 simultaneously from multiple satellites 16 via their broad beam antennas 22. The ground telecommunications hub 12 connects to all of the satellites 16 in the satellite constellation 14 individually and simultaneously. The hub 12 also pre-processes received signals to compensate for path differentials before sending radiating signals 24 to the satellites 16 as discussed in more detail below.

In accordance with the preferred embodiment, the design of the individual satellites 14 can be significantly simplified over those utilized in prior mobile systems because the satellite constellation 14 functions as a sparse radiating array. It is known that the more satellites 16 that are included in a satellite constellation 14, the better the performance the mobile satellite communications system 10 will achieve. Satellites that are simple, small, and provide high performance are preferable. This is because the performance of the system 10 depends more heavily on the satellite constellation 14 than on the individual satellites 16.

In a transmit mode, shown in FIG. 1, the individual satellites 16 radiate modulated RF power to a chosen FOV. The system 10 is still operable with reduced capacity and no reconfiguration even if one individual satellite 16 is lost for any reason. As a result, the system 10 features graceful degradation characteristics and provides very high reliability and availability. Most of the complexity of the system 10 is located in the ground hubs 12, which locate and track the potential users and perform the major functions of beamforming and filtering, as discussed below.

Figure 2:
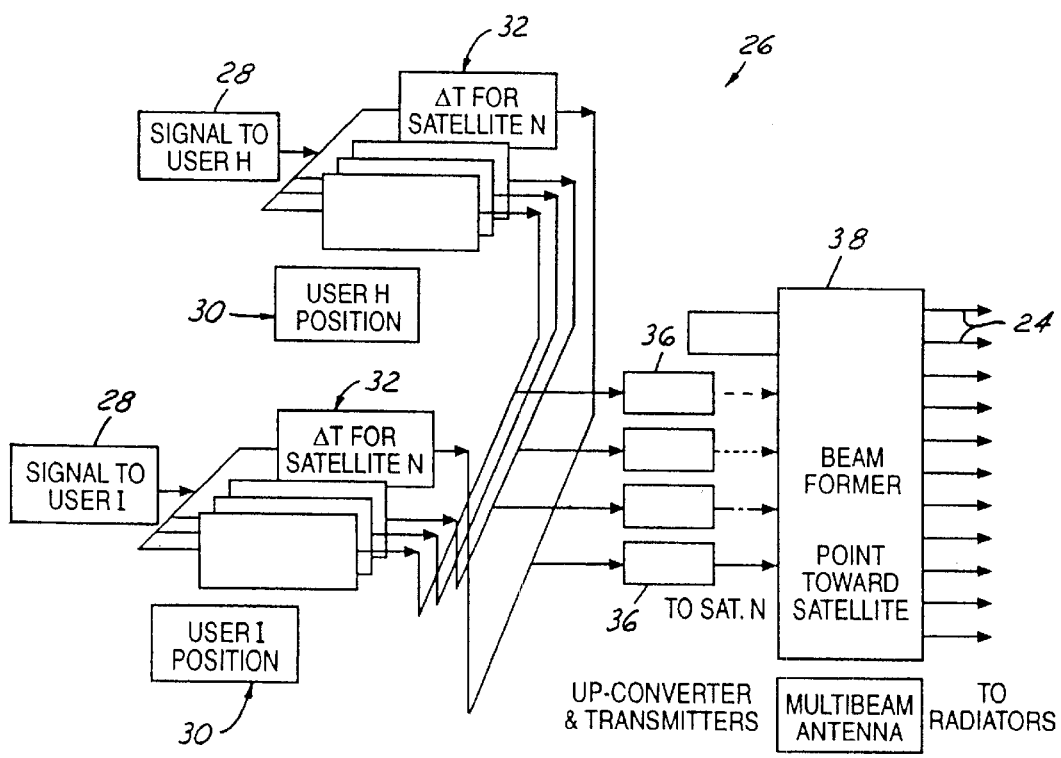
FIG. 2 is a schematic block diagram illustrating the signal transmission function of a ground telecommunications hub for a mobile satellite communications system in accordance with a preferred embodiment of the present invention.

As shown in FIG. 2, the processing performed at the ground telecommunications hub 12 is diagrammatically illustrated. The hub 12 tracks, updates, and forward predicts the time variant differential information among various paths between the hub 12 and the intended user terminals 18. The accuracy of this information must be within a tenth of an RF wavelength. For UHF satellite systems, the required path differential accuracy must be about ten (10) centimeters. For L and S band mobile satellite constellations, the accuracy must be on the order of one (1) centimeter. Unfortunately, the conventional or GPS techniques will not provide the required accuracy.

In accordance with the present invention, the required accuracy of equivalent path differentials, including all propagation distortion, can be provided using two-way active calibration and R2N (two-way ranging navigation) techniques. An R2N technique is just one technique for obtaining positioning information by which to locate the positioning of the satellites and users precisely using multiple calibration sites and is described in co-pending U.S. patent application Ser. No. 09/209,062, entitled "Method and System for Determining a Position of a Transceiver Unit Incorporating Two-Way Ranging Navigation as a Calibration Reference for GPS," and filed on Dec. 10, 1998. Other known techniques may also be utilized.

The ground telecommunications hub 12 has a processing center 26 that processes each signal and is shown in a transmit mode in FIG. 2. The hub 12 has the capability to address the plurality of satellites 16 individually through the use of antenna spatial discrimination to separate signals to different satellites. Alternatively, code identification can also be used to address different satellites independently.

As shown in FIG. 2, assuming that there are "H" users, the signals from user 1 to user H. identified generally by reference number 28, are input into the processing center 26. The position of the various users (1 to H), is determined generally by the circuitry from the various user signals 28, designated by reference number 30. The various user signals 28 for user 1 to user H are then combined for transmission to the different satellites 16, as generally indicated by reference number 32. In this case, the signal is sent to N satellites, assuming N satellites in the constellation. The combined signals are then amplified, filtered, up converted, and then further amplified, as generally indicated by reference number 36. These signals are then delivered to a multiple beam antenna 38 where beamforming processing is done so that the signals can be transmitted to the N satellites via radiating signals 24. The beam-forming process can be done in baseband or a low IF frequency band by either digital or analog means. For a low bandwidth-(less than a few MHz signals), digital implementation can provide cost advantages. The processed signal 24, radiated from the ground hub 12 via multiple paths, is amplified, filtered, and then re-radiated by each of the multiple satellites 16 to arrive at a designated user location simultaneously. Consequently, the radiated signals from the multiple satellites will be combined coherently via a hand held terminal 18.

Equivalently, the effect of the spatial processing performed by the processing center 26 is to focus signal strength on the user for multiple satellites 16, which act like sparsely separated portions of a large active reflector. Therefore, the processing on the ground will insert different time delays into the signals 24 which are radiated via various paths. The time delays will be inserted into the signals 24 as if the satellites were located on an ellipsoidal surface, of which the two foci are located exactly at the hub 12 and the designated user 18 positions respectively. In low and middle earth orbit constellations, the users 18 and the hub 12 will always be in the near field of the sparse array.

Figure 3:
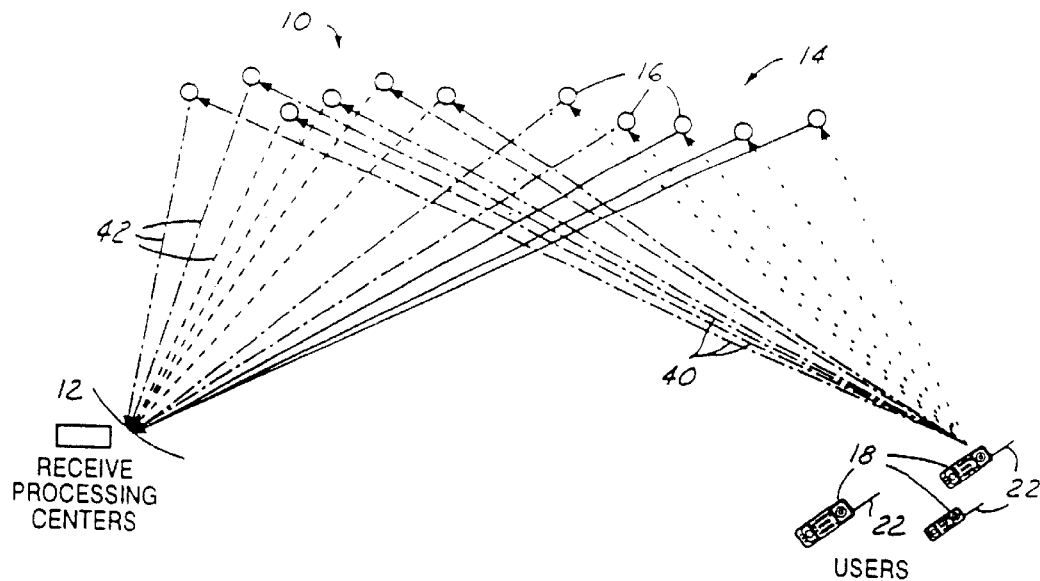
FIG. 3 is a perspective view illustrating the return link geometry of a mobile satellite communications system in accordance with a preferred embodiment of the present invention.

In a receive mode, shown in FIG. 3, the individual satellites 16 collect the RF signals from the same FOV. FIG. 3 thus illustrates the return link geometry for receiving signals sent from the user terminals 18 to the ground telecommunications hub 12. As shown in FIG. 3, there are two groups of links involved: the links between users 18 and the satellites 16, generally indicated by reference number 40, and those between the satellites 16 and the hub 12, as generally indicated by reference number 42. The user antennas 22 must be able to illuminate all the satellites 16 involved. There will also be a constraint on the variation and gain of the user antenna 22 over the cluster.

As with the forward link geometry, the satellites 16 will amplify the signals 40 received from the users 18 and re-radiate the signals 42 toward the hub 12. The hub 12 can receive signals 42 independently, but simultaneously from the satellites 16, and will add the signals 42 from different satellites coherently in the post-processor 44 as illustrated in FIG. 4.

Figure 4:
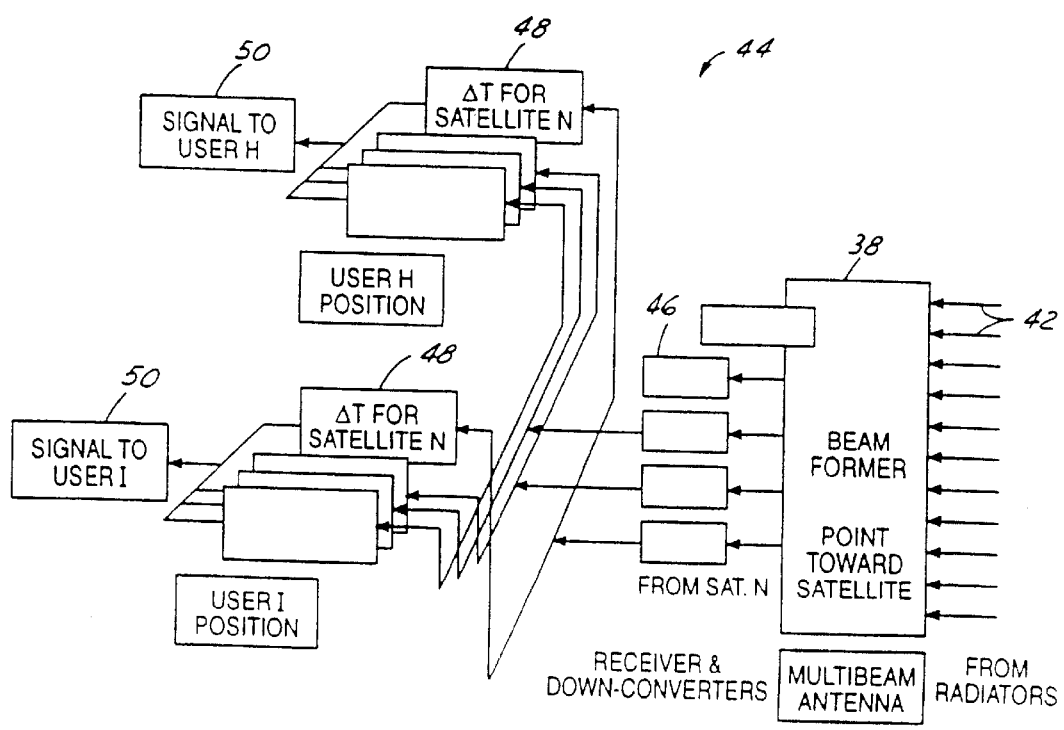
FIG. 4 is a schematic block diagram illustrating the signal receive function of a ground telecommunications hub for a mobile satellite communications system in accordance with a preferred embodiment of the present invention.

The signal flows on the block diagram shown in FIG. 4 illustrate the receive function of the post-processor 44 and the hub 12. The signal flows are reversed from the corresponding ones in FIG. 2. Therefore the receive process will not be reiterated in detail. However, the links 42 from the satellites 16 to the hub 12 are received at the beamformer 38 and then transferred to the receiver and down converters 46 before the signals are separated. The signals are separated depending upon the user to which they are to be transmitted, as generally indicated by reference number 48, and then sent to the specific user 1 through H, as generally indicated by reference number 50. It should be understood that both the receive and transmit function are a necessary part of pathlink calibration and user positioning.

The technique of the present invention has been demonstrated to significantly reduce the average side lobe levels. It has been determined that this is due to three factors. First, the proposed architecture is not a periodic array, but rather a randomly spaced sparse array, which has no grating lobes. Although the average side lobe at a single frequency is relatively high, the level decreases with increasing bandwidth. Second, the large sparsely filled array formed by moving satellites is a large extended aperture size. Thus, all of the users on the ground are in the near field of the extended aperture and the wave fronts received by all users are spherical instead of planar. Consequently, dispersion effects become much more pronounced than would be the case in the far field. The dispersion grows very fast as a probe is scanned away from the main beam and the dispersion smears the power distribution very effectively over a finite signal bandwidth. Third, the communication system is preferably designed with a finite frequency spectrum. The information signal will therefore be spread over a finite bandwidth via CDMA or through short duration waveforms for TDMA schemes.

Figure 5:
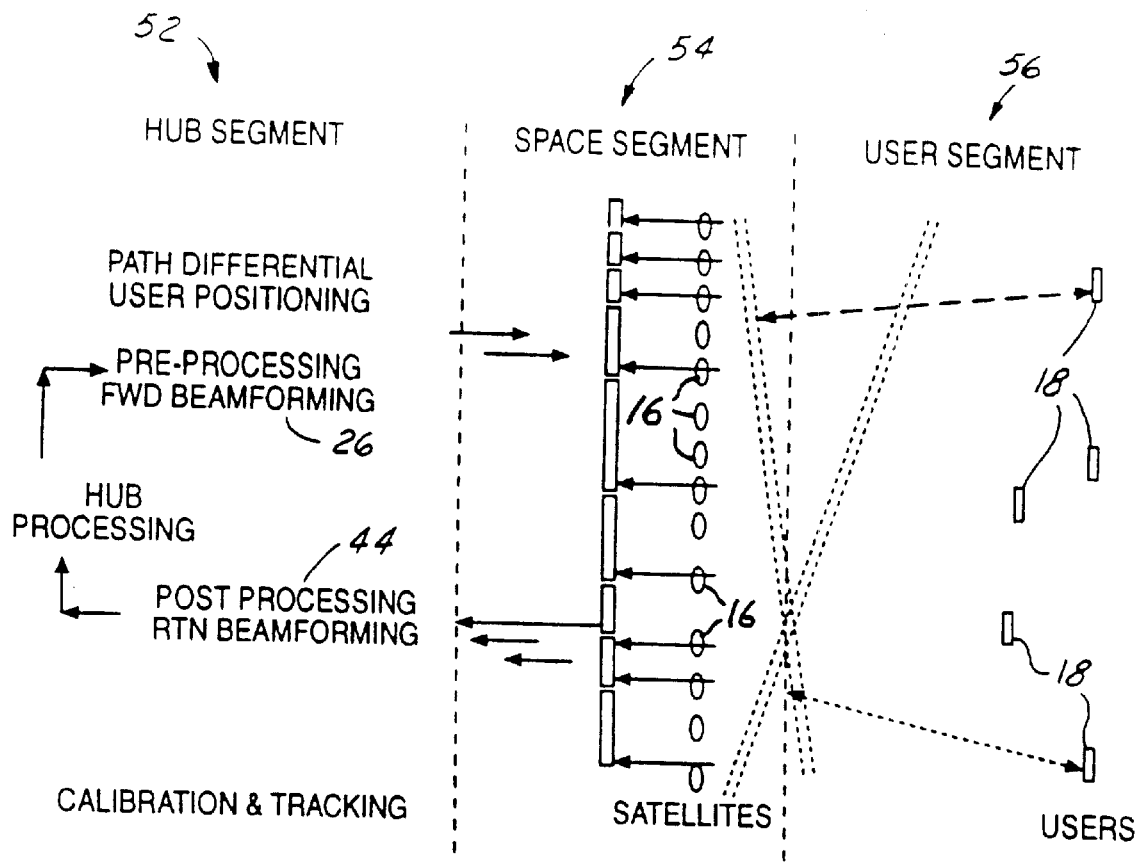
FIG. 5 is a schematic flow diagram illustrating the overall architecture for a multiple satellite mobile communications system in accordance with a preferred embodiment of the present invention.

FIG. 5 illustrates diagrammatically the operation of the invention, which allows for the increased re-use of precious frequency spectrum. The advantages provided by this system include no limitation on frequency re-use for point-to-point communications. Rather, the capacity of this system is only limited by total satellite RF power. Further, the preferred embodiment allows for the use of simple and low cost satellite designs, because the more satellites included in the constellation, the better the performance of the overall system. The system also provides high system reliability through graceful degradation, as well as concentrating complex processing at the hubs. The preferred embodiment creates demand for a large number of low cost satellites and also uses R2N techniques to perform satellite and user positioning. The more users using this system, the more accurately the satellite and user positions can be determined. However, even more important than the actual positions of the users and satellites are the path lengths traversed by the signals. Therefore, periodic calibration techniques applied directly to those path lengths may be much simpler and more cost effective. Further, the system also provides advantages of CDMA and TDMA to the system performance through large percentage bandwidth.

As shown in FIG. 5, the present invention is divided up into three segments; a hub segment 52 containing the ground telecommunications hub 12, a space segment 54 containing a plurality of individual satellites 16, and a user segment 56, having a plurality of user terminals 18. The hub segment also has a processing center 26 and a post-processor 44 for processing the signals during the transmission and receive modes.

Having now fully described the invention, it will be apparent to one of ordinary skill in the art that many changes and modifications can be made thereto without departing from the spirit or scope of the invention as set forth herein.

What is claimed is:

1. A mobile satellite communications system for mobile users, comprising:

a satellite constellation having a plurality of individual satellites which act as a sparse radiating array;

a ground telecommunications hub in communication with each of said plurality of individual satellites, such that a signal processed by said ground telecommunications hub is radiated through a plurality of paths to a plurality of said individual satellites in said satellite constellation, wherein said ground telecommunications hub includes a processing center for receiving a plurality of signals and processing the signals to be transmitted to said plurality of individual satellites and wherein said processing center includes:

apparatus for combining said plurality of received signals for transmission to said plurality of individual satellites;

apparatus for amplifying said combined signals;

apparatus for filtering said combined signals;

apparatus for up-converting said combined signals;

a beam former for forming multiple beams for transmitting signals to said plurality of satellites, and apparatus for predicting any time variant differential among various paths between said hub and said mobile terminal, and a mobile terminal for receiving said signal radiated from said plurality of individual satellites simultaneously, wherein said signal is processed by said ground telecommunications hub to be transmitted through said plurality of individual satellites such that said signal is received simultaneously at said mobile terminal.

2. The mobile satellite communications system of claim 1, wherein said apparatus for predicting said time variant utilizes two-way ranging navigation.

3. A method for transmitting a communications signal to a mobile hand-held terminal, comprising the steps of:

providing a ground telecommunications hub;

processing a signal at said ground telecommunications hub in order to focus signal strength at the mobile hand-held terminal from a plurality of satellites;

radiating said signal through multiple paths to said plurality of satellites in a satellite constellation;

re-radiating said signal from said plurality of satellites to the mobile hand-held terminal; and combining said re-radiated signal received from said plurality of satellites simultaneously at the mobile hand-held terminal, wherein said signal processing is such that said signal is transmitted through said plurality of individual satellites and received simultaneously at said mobile terminal.

4. The method of claim 3, further comprising:

processing a plurality of received user signals at said ground telecommunications hub.

5. The method of claim 4, wherein said step of processing said plurality of received user signals further comprises:

combining said plurality of received signals for transmission to said plurality of individual satellites.

6. The method of claim 5, wherein said step of processing said plurality of received user signals further comprises:

filtering said combined signals; and up-converting said combined signals.

7. The method of claim 6, wherein said step of processing said plurality of received user signals further comprises:

forming multiple beams for transmitting signals to said plurality of satellites.

8. A method for transmitting a communications signal to a mobile hand-held terminal, comprising the steps of:

providing a ground telecommunications hub;

processing a signal at said ground telecommunications hub;

predicting any time variant differential among multiple paths between said hub and said mobile terminal;

radiating said signal through said multiple paths to a plurality of satellites in a satellite constellation which are configured to act as a sparse radiating array; and re-radiating said signal from said plurality of satellites through multiple paths to the mobile hand-held terminal such that the multiple paths are received at the mobile hand-held terminal simultaneously, wherein processing said signal is performed such that said signal is received at the mobile hand-held terminal simultaneously.

9. The method of claim 8, further comprising:

processing a plurality of received user signals at said ground telecommunications hub.

10. The method of claim 9, wherein said step of processing said plurality of received user signals further comprises:

forming multiple beams for transmission to said plurality of satellites.

11. The method of claim 9, wherein said step of processing said plurality of received user signals further comprises:

combining said plurality of received signals for transmission to said plurality of satellites.

12. The method of claim 8, wherein said step of processing a signal at said ground telecommunications hub further comprises:

filtering said signal prior to said step of radiating.

13. The method of claim 12, wherein said step of processing a signal at said ground telecommunications hub further comprises:

up-converting said signal prior to said step of radiating.

* * * * *